(12) United States Patent
Jeffries et al.

(10) Patent No.: US 7,065,045 B2
(45) Date of Patent: Jun. 20, 2006

(54) METHOD AND SYSTEM FOR PROVIDING AN OPTIMAL PATH CHOICE FOR DIFFERENTIATED SERVICES

(75) Inventors: Clark Debs Jeffries, Durham, NC (US); Kartik Sudeep, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 09/753,965

(22) Filed: Jan. 3, 2001

(65) Prior Publication Data

US 2002/0085495 A1    Jul. 4, 2002

(51) Int. Cl.
H04L 12/56 (2006.01)

(52) U.S. Cl. .................. 370/230; 370/238; 370/401

(58) Field of Classification Search ............... 370/231, 370/232, 235, 238, 254, 255, 256, 395.21, 370/468, 477
See application file for complete search history.

(56) References Cited

U.S. PATENT DOCUMENTS

| | | | |
|---|---|---|---|
| 5,164,938 A * | 11/1992 | Jurkevich et al. ........... | 370/231 |
| 5,274,643 A | 12/1993 | Fisk | |
| 5,381,404 A * | 1/1995 | Sugano et al. ............. | 370/238 |
| 5,425,021 A | 6/1995 | Derby et al. | |
| 5,627,971 A | 5/1997 | Miernik | |
| 5,933,412 A | 8/1999 | Choudhury et al. | |
| 5,933,422 A * | 8/1999 | Kusano et al. ............. | 370/331 |
| 5,940,372 A * | 8/1999 | Bertin et al. ............... | 370/238 |
| 6,016,306 A | 1/2000 | Le Boudec et al. | |
| 6,044,075 A | 3/2000 | Le Boudec et al. | |
| 6,370,119 B1 | 4/2002 | Basso et al. | |
| 6,400,681 B1 * | 6/2002 | Bertin et al. ............... | 370/218 |
| 6,643,699 B1 | 11/2003 | Liver | |

(Continued)

FOREIGN PATENT DOCUMENTS

EP    0781068    6/1997

OTHER PUBLICATIONS

IBM Technical Disclosure Bulletin, vol. 35, No. 5, Oct. 1992, *Load Balancing For Variable Sized Connections with Dynamically Changing Bandwidth Requirements*.

(Continued)

*Primary Examiner*—Chau Nguyen
*Assistant Examiner*—Soon D. Hyun
(74) *Attorney, Agent, or Firm*—Sawyer Law Group LLP

(57) ABSTRACT

A method and system for providing a path for a new flow between a source node and a destination node in a network is disclosed. The network has a plurality of nodes and a plurality of links between the nodes. The nodes include the source node and the destination node. Each of the links is capable of including a plurality of existing flows and has a capacity. Each of the existing flows has a minimum guaranteed bandwidth. The method and system include determining a benefit for each link of a portion of the plurality of links coupled with a node of the plurality of nodes. The benefit is determined based on the capacity of the link and the minimum guaranteed bandwidth for a portion of the plurality of existing flows that is through the link, the node being a part of the path. The method and system also include selecting a link of the portion of the plurality of links to be part of the path. The link has a maximum benefit for the first portion of the plurality of links and is coupled the node with a second node of the plurality of nodes.

14 Claims, 4 Drawing Sheets

U.S. PATENT DOCUMENTS 6,697,333 B1 * 2/2004 Bawa et al. ................ 370/238
6,735,178 B1 * 5/2004 Srivastava et al. .......... 370/252

OTHER PUBLICATIONS

IBM Technical Disclosure Bulletin, vol. 34, No. 3, Aug. 1991, *Fast Optimal Assignment Algorithm*.

IBM Technical Disclosure Bulletin, vol. 28, No. 8, Jan. 1986, *Establishing Virtual Circuits in Large Computer Networks*.

IBM Technical Disclosure Bulletin, vol. 34, No. 8, Jan. 1992, *Distributed Minimal Spanning Tree Algorithm*.

* cited by examiner

US 7,065,045 B2

METHOD AND SYSTEM FOR PROVIDING AN OPTIMAL PATH CHOICE FOR DIFFERENTIATED SERVICES

FIELD OF THE INVENTION

The present invention relates to computer systems, and more particularly to a method and system for providing a path for a new flow between a source node and a destination node in a network

BACKGROUND OF THE INVENTION

FIG. 1 depicts a portion of a conventional network 10. The conventional network 10 includes nodes 12, 14, 16, 18, 20 and 22. The nodes 12, 14, 16, 18, 20 and 22 are connected by links 24, 26, 28, 30, 32, 34, 36 and 38. Although only six nodes 12, 14, 16, 18, 20 and 33 and eight links 24, 26, 28, 30, 32, 34, 36 and 38 are shown, a conventional network 10 typically includes a larger number of nodes and links. A particular link 24, 26, 28, 30, 32, 34, 36 and 38 is typically designated using the nodes 12, 14, 16, 18, 20 and 22 to which the link 24, 26, 28, 30, 32, 34, 36 and 38 is attached. For example, the link 24 is typically designated as link AB 24 because the link 24 links node A 12 with node B 14. However, for clarity, the links 24, 26, 28, 30, 32, 34, 36 and 38 will merely be designated by their numbers. Typically, users of the network have computer systems (not explicitly shown) that are coupled with one of the nodes 12, 14, 16, 18, 20 and 22. The nodes 12, 14, 16, 18, 20 and 22 may thus be routers for the network 10.

Each link 24, 26, 28, 30, 32, 34, 36 and 38 is used to allow traffic to flow through the network 10 between the nodes 12, 14, 16, 18, 20 and 22. Traffic travels through the network in flows. A flow can be viewed as a time sequence of datagrams from one input to one output. The input will be termed a source node while the output will be called the destination node. The sequence of links and nodes used in a flow is the path of the flow. Each flow typically passes through multiple nodes 12, 14, 16, 18, 20 or 22 and links 24, 26, 28, 30, 32, 34 and 36 between the source node and destination node. Each link 24, 26, 28, 30, 32, 34 and 36 includes multiple flows. In addition each link 24, 26, 28, 30, 32, 34 and 36 has a particular capacity, depicted in FIG. 1. For example, the capacity of the link 24 is five megabits per second ("Mb/sec"), while the capacity of the link 26 is six Mb/sec. One criterion for traffic from through the network 10 is that the bandwidths for the flows through a particular link 24, 26, 28, 30, 32, 34 and 36 not exceed the capacity of the link 24, 26, 28, 30, 32, 34 and 36. The bandwidth of a flow is the rate of the flow (generally somehow averaged over time) in bits per second through a particular component of the network 10.

In order to route data between different users of the network 10, a path through the network 10 must be selected. For example, suppose a user having a computer system coupled to the node A 12 sends a message to a user having a computer system coupled to the node F 16. Thus, node A 12 is the source node (node at which the message originates), while node F is the destination node (node at which the message is desired to terminate). There are many different paths through the network 10 that such a message could take. For example, the message could go from node A 12 through link 24 to node B 14, then through link 30 to node F. Similarly, the message could go from node A 12 through link 26 to node C 18, through link 34 to node E 22, through link 32, ending at node F 16. There are other possible paths for a message to take between the source node A 12 and the destination node F 16.

In order to select a path from the possible paths, a conventional routing protocol, or path selection method, is typically used. FIG. 2 depicts a conventional method 50 for selecting the path. The conventional method 50 uses a conventional open shortest path first ("OSPF") routing protocol. OSPF was developed for Internet protocol ("IP") networks by the interior gateway protocol ("IGP") for the Internet Engineering Task Force ("IETF") (see IETF RFC 1247). Currently, different versions of OSPF are used in conventional routing. The shortest path in OSPF is the path that has the minimum cost. The path having the minimum cost is the path through links having the largest available bandwidth. In addition, OSPF and the conventional method 50 use Dijkstra's algorithm, which computes a running cost for different alternate paths simultaneously. The path having the minimum cost is selected for transmission of data from the source node to the destination node.

Thus in the conventional method 50, a first node, or source node, is considered to be the current node, via step 52. The cost for each link coupled to the current node is calculated. To do so, the sum of the actual bandwidths for flows currently through each of the links coupled to the current node is calculated, via step 54. Thus, step 54 calculates the amount of traffic through each of the links coupled with the current node. The available bandwidth for each link coupled to the current node is then determined, via step 56. The available bandwidth for a link is the capacity of the link minus the sum of the bandwidths of flows currently or recently through the link. Thus, the available bandwidth is a measure of the space that a link currently has available to accommodate another flow. The link having the greatest available bandwidth is the link which has the lowest cost. Therefore, step 54 and 56 determine the link having the lowest cost. The link which has the lowest cost is then selected to be part of the path, via step 58. It is then determined whether the destination node has been reached, via step 60. If the destination node has not been reached, then the node at the other end of the link selected in step 58 is designated as the current node, via step 62. The method 50 then determined to step 54. If, however, the destination now has been reached, then the path is defined as the path which includes all the links selected in step 58 and the corresponding nodes.

For example, referring to FIGS. 1 and 2, suppose a path between the node A 12 and node F 16 is decided to be determined. The suppose that each of the links 24, 26, 28, 30, 32, 34, 36 and 38 is currently carrying a total of 4 Mb/sec for flows that are already existing. Thus, for ease of explanation, each of the links 24, 26, 28, 30, 32, 34, 36 and 38 is assumed the carrying the same amount of traffic. However, typically this is not the case. Using OSPF of the conventional method 50, the node A 12 and is the first current node designated step 52. The sum of the actual bandwidths for flows for each of the links 24 and 26 is 4 Mb/sec. The links 26 and 24 have capacities of six and five Mb/sec, respectively. Thus, the available bandwidth for the link 26 is two Mb/sec while the available bandwidth for the link 24 is one Mb/sec. Thus, the link 26 will be selected as part of the path. Because the destination is not been reached, the node C 18 is designated as the current node. When the steps 54 through 56 are performed for the links 28, 34 and 36, the link having the highest available bandwidth will be determined to be the link 34. Thus, the link 34 will be part of the path. Because the destination has not yet been reached, the node E 22 will be designated as the current node. The link having the highest available bandwidth from node E 22 is the link 32. Thus, the path from the node A 12 to the node F 16 is through link 26 to node C 18, then through link 34 to node E 22, then through the link 32 to the destination node F 16.

A relatively new development in managing traffic through network is DiffServ. DiffServ is an emerging IETF standard for providing differentiated services (see IETF RFC 2475 and related RFCs). Differentiated services are also described by RFC 2212 Specification of Guaranteed Quality of Service. S. Shenker, C. Partridge, R. Guerin. September 1997. (Format: TXT=52330 bytes) (Status: PROPOSED STANDARD), RFC 2474 Definition of the Differentiated Services Field (DS Field) in the IPv4 and IPv6 Headers. K. Nichols, S. Blake, F. Baker, D. Black. December 1998. (Format: TXT=50576 bytes) (Obsoletes RFC1455, RFC1349) (Status: PROPOSED STANDARD), RFC 2475 An Architecture for Differentiated Service. S. Blake, D. Black, M. Carlson, E. Davies, Z. Wang, W. Weiss. December 1998. (Format: TXT=94786 bytes) (Status: INFORMATIONAL), RFC 2750 RSVP Extensions for Policy Control. S. Herzog. January 2000. (Format: TXT=26379 bytes) (Updates RFC2205) (Status: PROPOSED STANDARD), RFC 2983 Differentiated Services and Tunnels. D. Black. October 2000. (Format: TXT=35644 bytes) (Status: INFORMATIONAL) and related RFCs. Differentiated services allow different flows to be provided with varying service. For example, a client may pay to have some guaranteed minimum amount of bandwidth (relatively expensive per bit per second) and some additional bandwidth if available up to a maximum rate (relatively inexpensive per bit per second). Thus, DiffServ allows a minimum guaranteed bandwidth to be set for each flow.

OSPF results in a path between the source node and the destination node even when differentiated services are provided. However, one of ordinary skill in the art will readily realize that the conventional method 50 does not take into account some of information used in providing differentiated services. Instead, paths are allocated to the based only on the traffic currently were recently through a particular link. The paths would thus be allocated without accounting for the minimum guaranteed bandwidths for existing flows already through the network 10. Thus, the path determined using the conventional method 50 when differentiated services are allowed may not be a path which allocates bandwidth in an optimal manner. For example, a path for a flow having a particular minimum guaranteed bandwidth might not include certain links because these links have a high current or recent flow. The large current or recent flow may be due to other flows which have high current bandwidths (for example because there was a large amount of excess bandwidth in the link that was allocated to the flows), but low minimum guaranteed bandwidths. Because the link is not included in the path, bandwidth in the link may not be allocated to the new flow even though it might be desirable to do so.

Accordingly, what is needed is a system and method for allocating bandwidth in links and, therefore, determining paths in a manner which better accounts for differentiated services. The present invention addresses such a need.

SUMMARY OF THE INVENTION

The present invention provides a method and system for providing a path for a new flow between a source node and a destination node in a network. The network has a plurality of nodes and a plurality of links between the nodes. The nodes include the source node and the destination node. Each of the links is capable of including a plurality of existing flows and has a capacity. Each of the existing flows has a minimum guaranteed bandwidth that is preferably positive. A new path is to be found for a new flow with a positive or zero minimum guaranteed bandwidth. The method and system comprise determining a benefit for each link of a portion of the plurality of links coupled with a node of the plurality of nodes. The benefit is determined based on the capacity of the link and the minimum guaranteed bandwidth for a portion of the plurality of existing flows that is through the link, the node being a part of the path. The method and system also comprise selecting a link of the portion of the plurality of links to be part of the path. The link has a maximum benefit for the first portion of the plurality of links and is coupled the node with a second node of the plurality of nodes.

According to the system and method disclosed herein, the present invention provides a path for a new flow that accounts for minimum guaranteed bandwidths for existing flows. Thus, a more optimal path through the network can be selected.

DETAILED DESCRIPTION OF THE INVENTION

The present invention relates to an improvement in routing of traffic through a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a path for a new flow between a source node and a destination node in a network. The network has a plurality of nodes and a plurality of links between the nodes. The plurality of nodes includes the source node and the destination node. Each of the links is capable of including a plurality of existing flows and has a capacity. Each of the flows has a minimum guaranteed bandwidth that is preferably positive. The method and system comprise determining a benefit for each link of a portion of the plurality of links coupled with a node of the plurality of nodes. The benefit is determined based on the capacity of the link and the minimum guaranteed bandwidth for a portion of the plurality of existing flows that is through the link, the node being a part of the path. The method and system also comprise selecting a link of the portion of the plurality of links to be part of the path for the new flow. The link has a maximum benefit for the first portion of the plurality of links and is coupled the node with a second node of the plurality of nodes.

The present invention will be described in terms of a particular network having certain components. However, one of ordinary skill in the art will readily recognize that this method and system will operate effectively for other networks having other constituents. In addition, the present invention will be described in the context of a particular algorithm. However, one of ordinary skill in the art will readily realize that the present invention is consistent with other algorithms.

Figure 3:
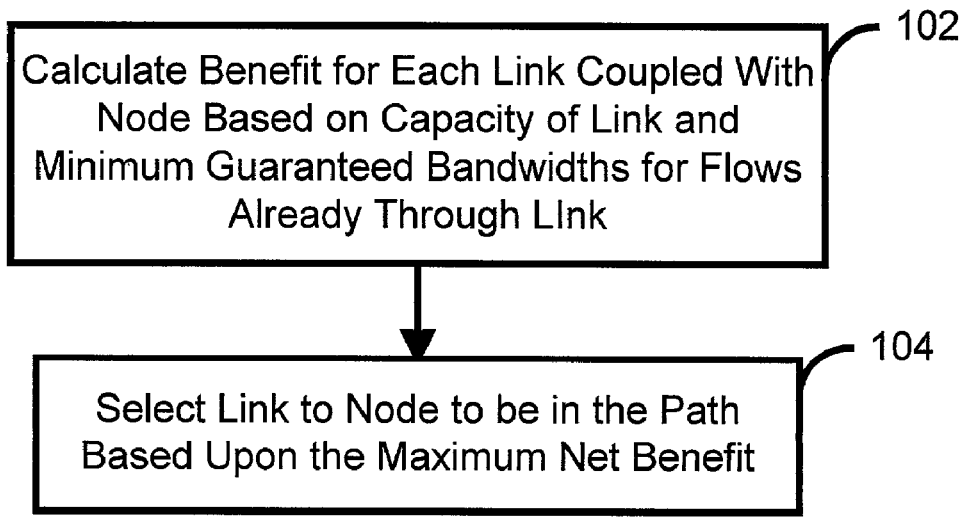
FIG. 3 depicts a high-level flow chart of one embodiment of a method for selecting a link to be part of the path in accordance with the present invention.

To more particularly illustrate the method and system in accordance with the present invention, refer now to FIG. 3, depicting a high-level flow chart of one embodiment of a method 100 in accordance with the present invention for selecting a link for a new path in a network. The network in which the method 100 is used can be the network 10 depicted in FIG. 1. Moreover, the method 100 can be used when differentiated services, and more particularly, DiffServ, are provided in the network. Thus, flows already through the links 24, 26, 28, 30, 32, 34, 36 and 38 have at least some sort of a minimum guaranteed bandwidth and may have a maximum guaranteed bandwidth. In a preferred embodiment, the method 100 treats flows having a positive minimum guaranteed bandwidth, ignoring flow having a lower (e.g. zero) minimum guaranteed bandwidth. However, the method 100 could explicitly treat flows having zero minimum guaranteed bandwidth. In addition, the flows already through each link have a current bandwidth. For example, a particular flow (not explicitly shown) may have a minimum guaranteed bandwidth in addition to a current or recent actual bandwidth through a particular link. The method 100 provides a path for a new flow, which may have a minimum guaranteed flow that is greater than or equal to zero.

For the links coupled to a node, a benefit for each link is determined, via step 102. The benefit for a link is based on the minimum guaranteed bandwidth for each existing flow through the link and the capacity of the link. Preferably, the benefit is the capacity of the link minus the sum of the minimum guaranteed bandwidths for each existing flow through the link. A link having the maximum benefit is selected as being part of the path based on a maximum benefit for the links, via step 104. The maximum benefit is preferably the highest benefit for the links. The link selected in step 104 couples the node with a second node in the network. Consequently, the method 100 can be repeated for the second node in order to select another link having a maximum benefit to a third node. Thus, the method 100 can be repeated so that a path from the source node to the destination node is provided through links having a maximum benefit. Thus, the new path provided for the new flow has a maximum benefit. Note that in one embodiment, the method 100 could also determine whether the bandwidth on the new path is sufficient for the minimum guaranteed bandwidth of the new flow and take appropriate action if sufficient bandwidth is not available.

Figure 4:
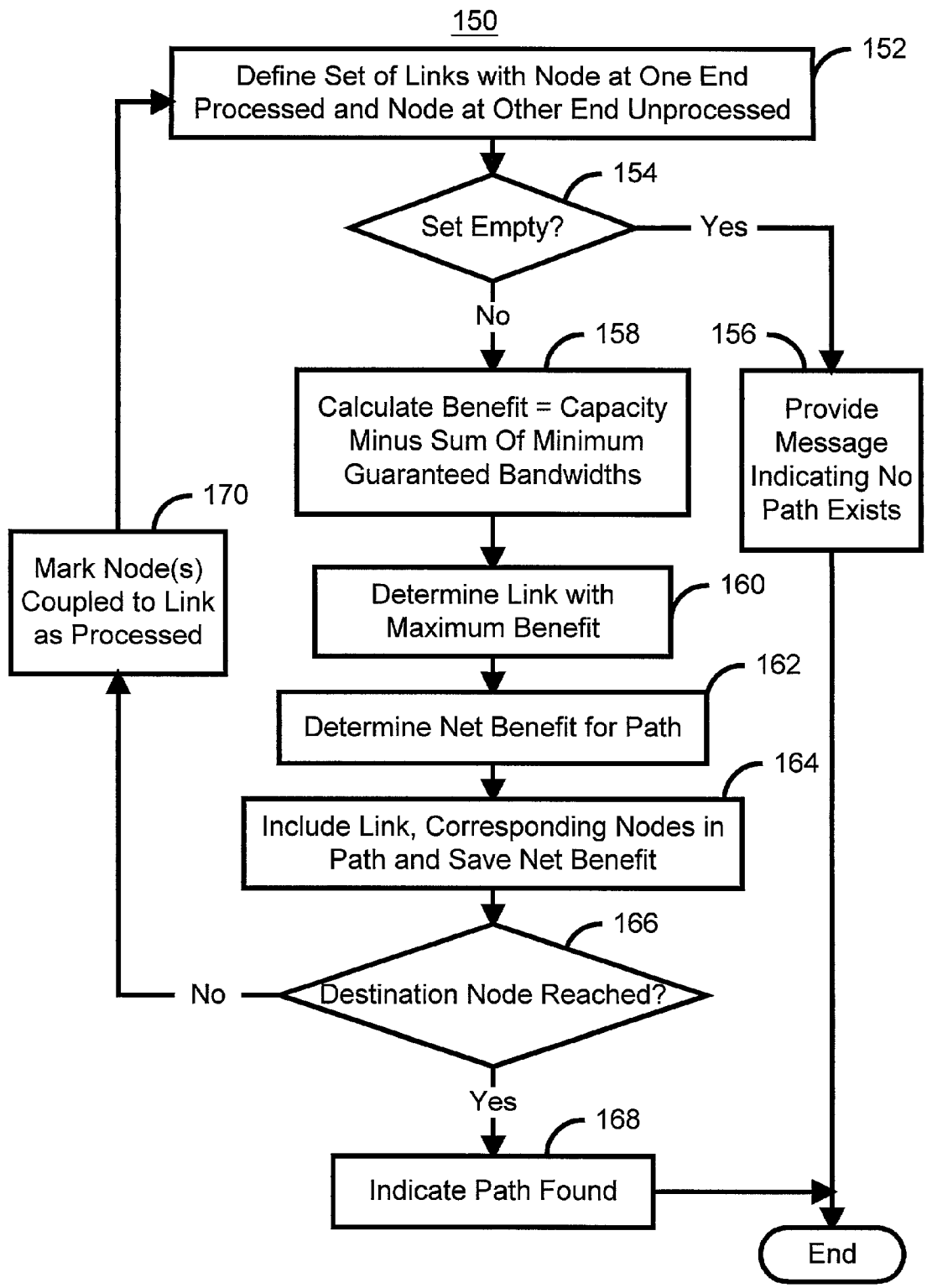
FIG. 4 is a more detailed flow chart of one embodiment of a method in accordance with the present invention for selecting a new path for providing a new path.

In a preferred embodiment, the path is selected based on Dijkstra's algorithm. Thus, FIG. 4 depicts a preferred embodiment of a method 150 in accordance with the present invention. In a preferred embodiment, the method 150 treats flows having a positive minimum guaranteed bandwidth, ignoring flow having a lower (e.g. zero) minimum guaranteed bandwidth. However, the method 150 could explicitly treat flows having zero minimum guaranteed bandwidth without substantially changing the method 150 or the resulting path. The method 150 preferably starts with the source node being included as a node of the path and, therefore, as a processed node. Assuming that the net benefit, described below, is initially set to be infinite. A set of links having one node that has been processed and one node that has not been processed is defined, via step 152. A node which is processed is one that is coupled to a link that has been included in the path and is thus in the path. It is determined whether the set of links is empty, via step 154. If so, then a message indicating that no path can be found, via step 156. The method then terminates. Otherwise, the benefit for each of the links in the set is determined, via step 158. The benefit for a link is the capacity of the link minus the sum of the minimum guaranteed bandwidth for each of the existing flows through the link. The link with the maximum benefit is then determined, via step 160. A net benefit for the path is then defined as the minimum benefit for each of the links in the path, via step 162. Step 162 is preferably performed by taking the minimum of a current net benefit for the path and the benefit for the link having the maximum benefit just found. The link having the maximum benefit, determined in step 160, and the nodes at either end of the link are then included in the path, via step 164. It is then determined whether the destination node has been reached, via step 166. If so, then a message indicating the path has been found is provided, via step 168. The method 150 then terminates. If the destination node has not been reached, then the node for the link determined in step 160 not previously in the path is marked as a processed node and, therefore, as part of a path, via step 170. The method then returns to step 152.

Figure 1:
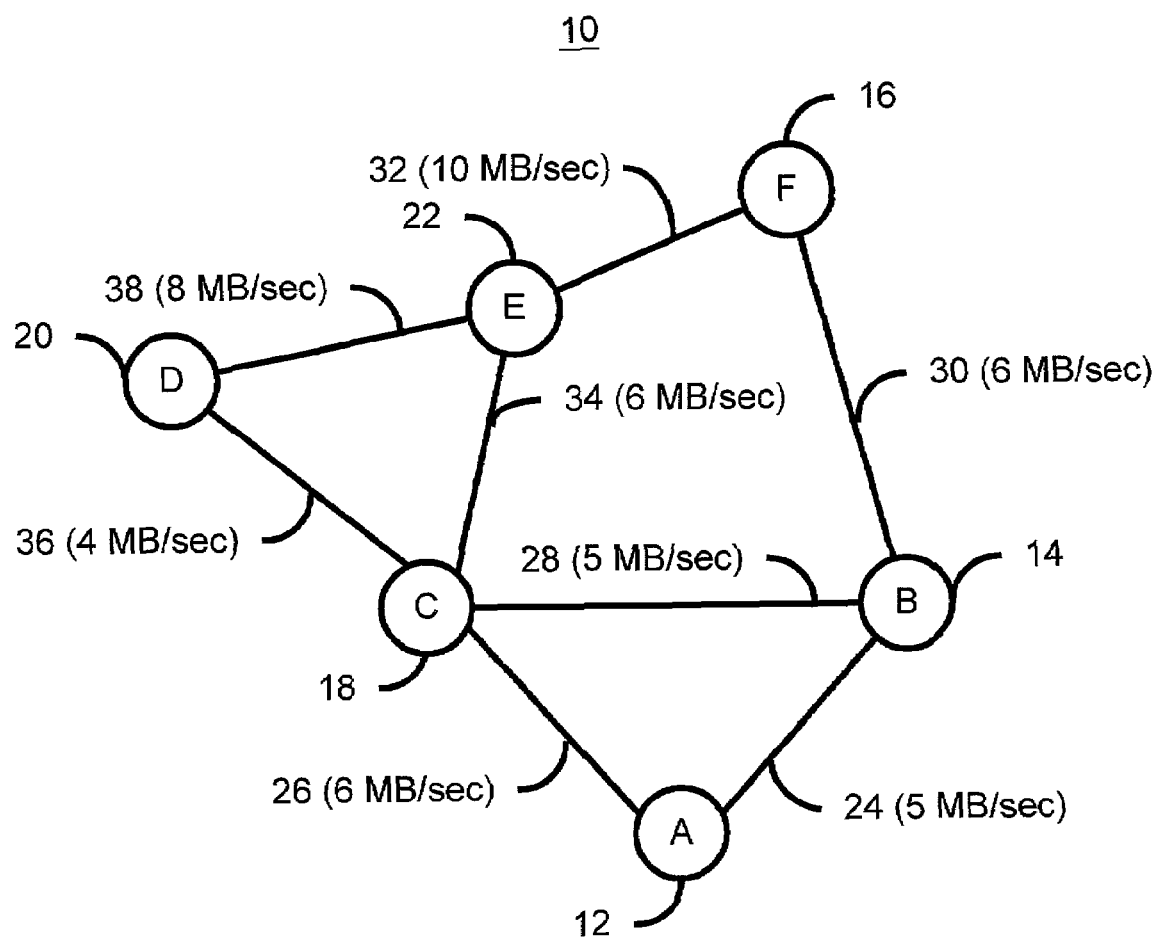
FIG. 1 is a block diagram of a conventional network.

For example, referring to FIGS. 1 and 4, suppose a path is to be provided between the source node A 12 and the destination node F 16. Also suppose that all of the links 24, 26, 28, 30, 32, 34, 36 and 38 currently carry four Mb/sec. In step 152 the links which are coupled to the node A 12 are placed into a set of links to be processed. These links are links 24 and 26. The set of links is not empty, so the benefit for the links 24 and 26 is calculated in step 158. Suppose that the sum of the minimum guaranteed bandwidths for the flows already through the link 26 is four Mb/sec and that the sum of the minimum guaranteed bandwidths for the flows already through the link 24 is two Mb/sec. The benefit for the link 26 is thus two Mb/sec, while the benefit for the link 24 is three Mb/sec. Thus, the link 24 is determined to be the link with the maximum benefit in step 160. The net benefit for the path is then set at the benefit for link 24, three Mb/sec, in step 162 because the net benefit was initially set at infinity. The link 24 and the nodes A 12 and B 14 are thus included in the path in step 164. The node B 14 is marked as processed in step 170. The method then returns to step 152.

Figure 2:
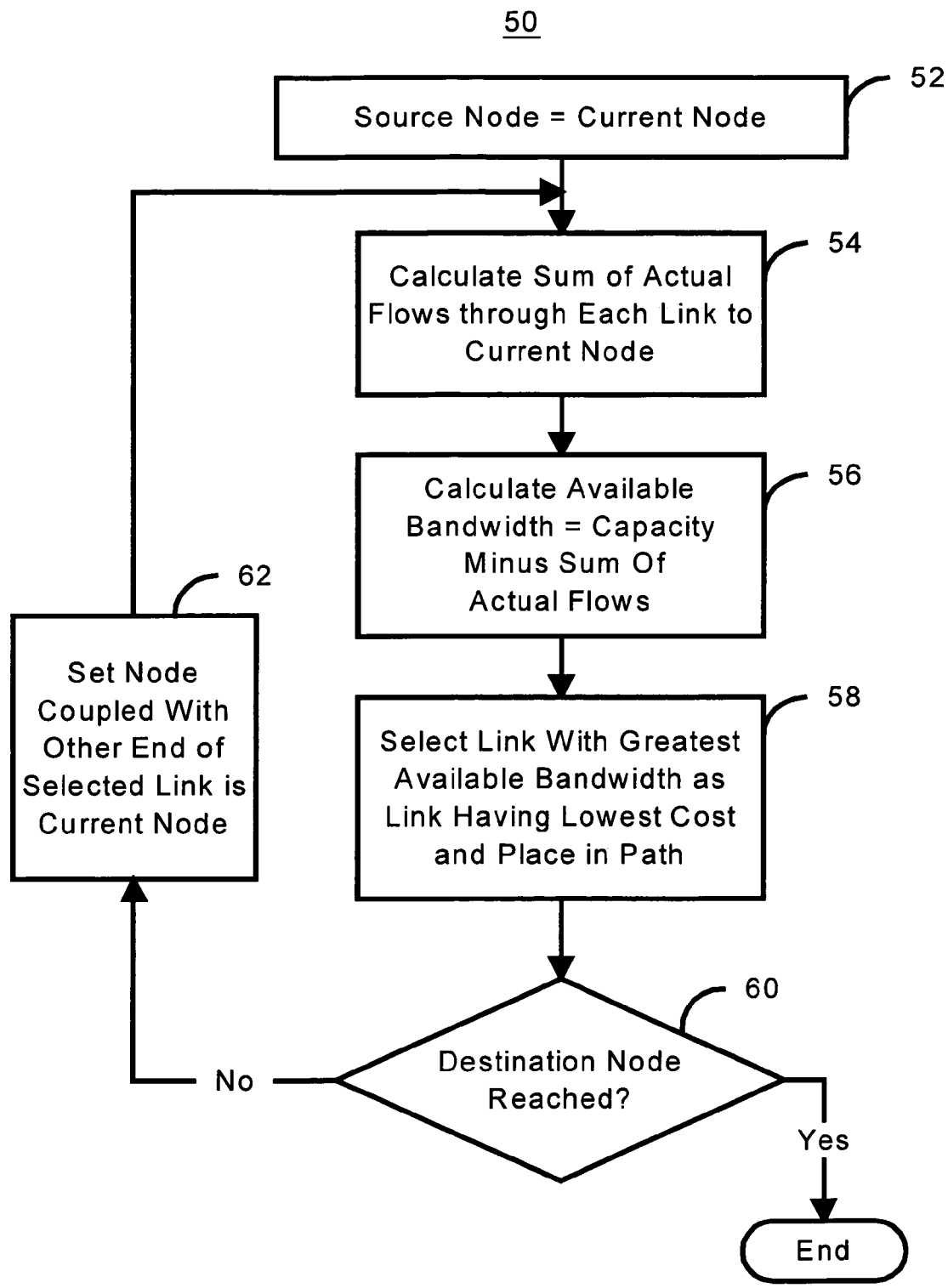
FIG. 2 depicts a flow chart of a conventional method for selecting a new path.

A new set of links, which includes the links 26, 28 and 30, is determined in step 152. Because the set is not empty, the benefit for each of the links 26, 28 and 30 is determined. The benefit for the link 26 may still be two Mb/sec. Assume that the sum of the minimum guaranteed bandwidths for flows already through the links 28 and 30 is zero. This is true even though, as discussed above, the links 28 and 30 each currently carry four Mb/sec. Thus, the benefit for the links 28 and 30 is five Mb/sec and six Mb/sec, respectively. The link having the maximum benefit is thus the link 30. The net benefit for the path, however, is still three Mb/sec because the previous net benefit is smaller than the benefit for the link 30. The link 30 and the corresponding node F 16 is included in the path. Note that the node B 14 was already in the path. Because the node F is the destination node, the method 150 would then end. Thus, the optimal path, having the maximum benefit, is through links 24 and 30. Note that this path is different from the path determined by the conventional method 50 using OSPF under similar conditions, as described above with respect to FIGS. 1 and 2. Referring back to FIG. 4, the path selected for the new flow has a bandwidth optimized in terms of existing minimum guaranteed bandwidths, not current actual traffic, which might be handled using conventional OSPF.

Referring to FIGS. 1, 3 and 4, the path having the largest benefit is selected using the method 100 and the method 150. This path is selected taking into account the minimum guaranteed bandwidths of flows already in the network 10. Thus, the path selected by the methods 100 and 150 is an optimal path that can account for differentiated services being provided in the network 10. Thus, the methods 100 and 150 can provide a path which, link by link, has a bandwidth greater than or equal to a path selected using conventional OSPF as in the method 50. Thus, the methods 100 and 150 select a path for a new flow that has a bandwidth optimized for minimum guaranteed bandwidths instead of being based on current bandwidths. Furthermore, the methods 100 and 150 may result in a more predictable allocation of bandwidth. In addition, when the methods 100 and 150 are combined with other mechanisms for allocating bandwidth, the flows can be increased above the minimum guaranteed bandwidth or decreased to the minimum guaranteed bandwidth based on available bandwidth in the link.

Figure 5:
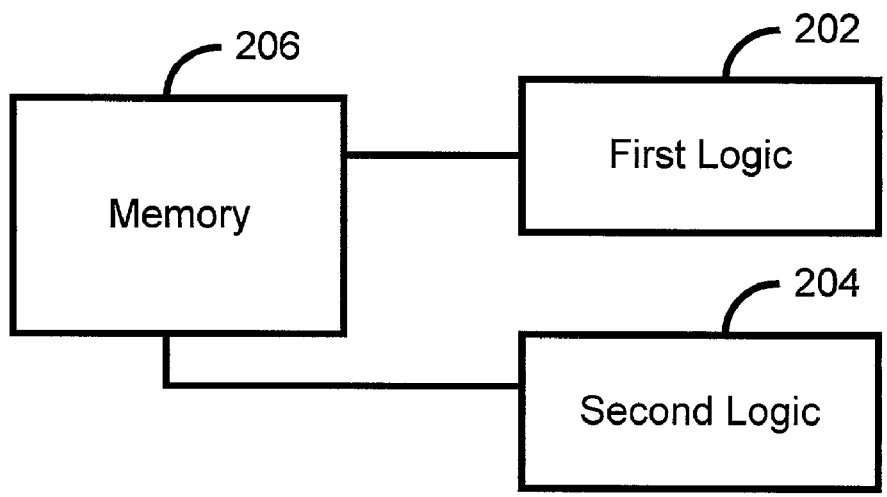
FIG. 5 is a block diagram of one embodiment of a system in accordance with the present invention for selecting a new path.

FIG. 5 depicts one embodiment of a system 200 in accordance with the present invention for selecting a new path for a new flow. Preferably, the methods 100 and 150 are algorithms run by a processor. The system 200 is also capable of performing the methods 100 and 150. Thus, the system 200 includes first logic 202, second logic 204 and a memory 206. Note that the first logic 204 and second logic 206 could simply be included in a processor. The first logic 202 determines the benefit for each link. The second logic 204 selects the link having the maximum benefit for the path based on the benefits determined by the first logic. The memory 206 is capable of storing information about the path, such as the nodes and/or links that are part of the path. The memory 206 also stores information used by the first logic 202 and the second logic 204.

A method and system has been disclosed for providing new paths through a network having differentiated services. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a path for a new flow between a source node and a destination node in a network having a plurality of nodes and a plurality of links between the plurality of nodes, the plurality of nodes including the source node and the destination node, each of the plurality of links capable of including a plurality of existing flows and having a capacity, each of the plurality of existing flows including a minimum guaranteed bandwidth, the method comprising the steps of:

(a) for a node of the plurality of nodes, determining a benefit for each link of a portion of the plurality of links, the portion of the plurality of links being coupled with the node, the benefit being determined based on the capacity of the link and the minimum guaranteed bandwidth for a portion of the plurality of existing flows that is through the link, the node being a part of the path; and (b) selecting a link of the portion of the plurality of links to be part of the path, the link having a maximum benefit for the first portion of the plurality of links, the link coupling the node with a second node of the plurality of nodes.

2. The method of claim 1 further comprising the steps of:

(c) determining a next node of the plurality of nodes as being a node connected to the link selected in step (b).

3. The method of claim 1 wherein the benefit is the capacity minus the sum of the minimum guaranteed bandwidth for each existing flow of the portion of the plurality of existing flows through the link.

4. The method of claim 2 further comprising the step of:

(d) repeating the benefit determining step (a), the link selecting step (b) and the next node determining step (c) until the destination node is reached.

5. The method of claim 3 further comprising the step of:

(e) determining a net benefit for the path, the net benefit of the path being the lowest maximum benefit.

6. The method of claim 2 wherein the benefit determining step (a) further includes the step of:

(a1) eliminating a particular link of the portion of the plurality of links if the benefit for the particular link is less than or equal to zero.

7. The method of claim 2 further comprising the step of:

(d) determining whether the path between the source node and destination node can exist; and (e) notifying a user if the path cannot exist.

8. A computer-readable medium including a program for providing a path for a new flow between a source node and a destination node in a network having a plurality of nodes and a plurality of links between the plurality of nodes, the plurality of nodes including the source node and the destination node, each of the plurality of links capable of including a plurality of existing flows and having a capacity, each of the plurality of existing flows including a minimum guaranteed bandwidth, the program including instructions for:

(a) for a node of the plurality of nodes, determining a benefit for each link of a portion of the plurality of links, the portion of the plurality of links being coupled with the node, the benefit being determined based on the capacity of the link and the minimum guaranteed bandwidth for a portion of the plurality of existing flows that is through the link, the node being a part of the path; and (b) selecting a link of the portion of the plurality of links to be part of the path, the link having a maximum benefit for the first portion of the plurality of links, the link coupling the node with a second node of the plurality of nodes.

9. A system for providing a path for a new flow between a source node and a destination node in a network having a plurality of nodes and a plurality of links between the plurality of nodes, the plurality of nodes including the source node and the destination node, each of the plurality of links capable of including a plurality of existing flows and having a capacity, each of the plurality of existing flows including a minimum guaranteed bandwidth, the system comprising:

first logic for determining a benefit for each link of a first portion of the plurality of links coupled to a node in the path, the benefit being determined based on the capacity of the link and the minimum guaranteed bandwidth for a portion of the plurality of existing flows that is through the link;

second logic for selecting a link of the first portion of the plurality of links to be part of the path, the link having a maximum benefit for the first portion of the plurality of links; and a memory coupled with the first logic and the second logic, the memory for storing an identity of the link.

10. The system of claim 9 further wherein the second logic automatically determines a next node of the plurality of nodes as being a node connected to the link selected by the second logic.

11. The system of claim 9 wherein the benefit is the capacity minus the sum of the minimum guaranteed bandwidth for each existing flow of the portion of the plurality of existing flows through the link.

12. The system of claim 9 wherein a net benefit for the path is determined, the net benefit of the path being the lowest maximum benefit.

13. The system of claim 10 wherein the first logic further eliminates a particular link of the first portion of the plurality of links if the benefit for the particular link less than or equal to zero.

14. The system of claim 10 further comprising:

third logic for determining whether the path between the source node and destination node can exist and for notifying a user if the path cannot exist.

\* \* \* \* \*